United States Patent
Rosso et al.

(10) Patent No.: US 10,910,869 B2
(45) Date of Patent: Feb. 2, 2021

(54) CHARGING A CAPACITOR FROM A BATTERY

(71) Applicant: ZapGo Ltd, Harwell (GB)

(72) Inventors: Vincent Anthony Rosso, Harwell (GB); Michael Cameron Rigg, Harwell (GB); David William Donkin McTurk, Harwell (GB)

(73) Assignee: Zapgo Ltd, Harwell (GB)

( * ) Notice: Subject to any disclaimer, the term of this patent is extended or adjusted under 35 U.S.C. 154(b) by 0 days.

(21) Appl. No.: 16/100,755

(22) Filed: Aug. 10, 2018

(65) Prior Publication Data

US 2020/0052517 A1    Feb. 13, 2020

(30) Foreign Application Priority Data

Aug. 9, 2018 (GB) .................................. 1812999.9

(51) Int. Cl.
| | | |
|---|---|---|
| *H02J 7/00* | (2006.01) | |
| *H02J 7/34* | (2006.01) | |
| *B60L 50/40* | (2019.01) | |
| *H01M 2/10* | (2006.01) | |
| *H02M 3/07* | (2006.01) | |

(52) U.S. Cl.
CPC ............. *H02J 7/342* (2020.01); *B60L 50/40* (2019.02); *H01M 2/1072* (2013.01); *H02M 3/07* (2013.01)

(58) Field of Classification Search
CPC ... Y02T 10/7005; Y02T 90/14; Y02T 10/705; Y02T 10/7088; Y02E 60/12
See application file for complete search history.

(56) References Cited

U.S. PATENT DOCUMENTS

| | | |
|---|---|---|
| 6,597,150 B1 | 7/2003 | Bertness et al. |
| 6,788,025 B2 | 9/2004 | Bertness et al. |
| 7,015,674 B2 | 3/2006 | Vonderhaar |
| 7,479,763 B2 | 1/2009 | Bertness |
| 7,501,795 B2 | 3/2009 | Bertness et al. |
| 9,673,652 B2 | 6/2017 | Inskeep |
| 2011/0234162 A1* | 9/2011 | Kinoshita ............. H02J 7/0016 320/116 |
| 2012/0068662 A1 | 3/2012 | Durando et al. |
| 2016/0049819 A1* | 2/2016 | Butler ................... H02J 7/0054 320/105 |
| 2017/0093183 A1* | 3/2017 | Shen ..................... H02J 7/0016 |
| 2017/0163066 A1 | 6/2017 | Inskeep et al. |
| 2017/0191459 A1 | 7/2017 | Zhang |

(Continued)

FOREIGN PATENT DOCUMENTS

| | | |
|---|---|---|
| EP | 2816221 A1 | 12/2014 |
| EP | 3079221 A1 | 10/2016 |

(Continued)

*Primary Examiner* — Arun C Williams
(74) *Attorney, Agent, or Firm* — Hodgson Russ LLP

(57) ABSTRACT

An apparatus for charging one or more capacitors from a battery (18) comprising a DC-DC converter (130) coupleable between the battery (18) and the one or more capacitors (122). The apparatus is arranged to draw a supply current from the battery (18) and supply a charging current to the one or more capacitors (122). The DC-DC converter (130) determines a supply power drawn from the battery (18) and alters the supply current drawn from the battery (18) dependent upon the determined supply power. A corresponding method is also disclosed.

18 Claims, 7 Drawing Sheets

(56) References Cited

U.S. PATENT DOCUMENTS

2017/0276113 A1     9/2017  Hashim et al.
2017/0310153 A1    10/2017  Inskeep
2017/0368957 A1*   12/2017  Lei .......................... B60L 58/12

FOREIGN PATENT DOCUMENTS

EP      3211755 A1    8/2017
WO      9938240 A1    7/1999
WO    201803555 A1    3/2018

* cited by examiner

CHARGING A CAPACITOR FROM A BATTERY

FIELD OF THE DISCLOSURE

The present disclosure relates to an apparatus and method for charging one or more capacitors from a battery. The disclosure has particular, but not exclusive, applicability to extracting electrical energy from a partially depleted vehicle battery and using this energy to temporarily supplement the vehicle battery to facilitate operation of a vehicle starter motor.

Background to the Disclosure

A common fault that prevents the operation of a vehicle is a depleted battery. A depleted battery may not be able to provide enough electrical power to a starter motor to turn over the engine of the vehicle. Such a fault may occur, for example, when a light is left on within the vehicle or simply when the temperature of the battery drops in cold weather. Historically, this problem has been solved by connecting the depleted battery to a healthy battery of a separate vehicle using jump cables before attempting to start the faulty vehicle. While effective, this method requires another vehicle to be present, which may sometimes be problematic.

Due to this, portable jump starters are sometimes used, in which a battery pack is connected across terminals of the depleted battery to both charge and supplement the battery. While these portable jump starters have certain advantages, they problematically require the battery pack to be charged regularly to ensure that, at the time of need, there is sufficient energy stored. Users often forget to do this.

SUMMARY

According to at least one aspect of the disclosure herein, there is provided an apparatus for charging one or more capacitors from a battery, the apparatus comprising: a DC-DC converter coupleable between the battery and the one or more capacitors and arranged to draw a supply current from the battery and supply a charging current to the one or more capacitors; wherein the DC-DC converter is arranged to determine a supply power drawn from the battery and to alter the supply current drawn from the battery dependent upon the determined supply power.

Preferably, the DC-DC converter is arranged to alter the supply current drawn from the battery to maximise the supply power drawn from the battery.

Preferably, the DC-DC converter is arranged to determine a voltage across the one or more capacitors and to alter the charging current supplied to the one or more capacitors dependent upon the determined voltage.

Optionally, the DC-DC converter is arranged to alter the charging current provided to the one or more capacitors to maximise the charging power provided to the one or more capacitors. This may be used to minimise the charging time.

Optionally, the DC-DC converter is arranged to alter the charging current supplied to the one or more capacitors such that a charging voltage provided to the one or more capacitors to be higher than the voltage across the one or more capacitors. Preferably, the charging voltage provided is less than 1V higher than the voltage across the one or more capacitors, more preferably less than 0.1V, yet more preferably less than 0.01V.

Optionally, the DC-DC converter is arranged to alter the supply current drawn from the battery periodically. Optionally, the DC-DC converter is arranged to alter the charging current provided to the one or more capacitors periodically.

Preferably, the DC-DC converter is operable to alter the charging current supplied to the one or more capacitors such that the charging voltage provided to the one or more capacitors is less than a supply voltage across the battery. The DC-DC converter then has the capability to act as a step down converter; this does not necessarily preclude the DC-DC converter from having the capability to act as a step up converter. The DC-DC converter may be operable to altering the charging voltage provided to the one or more capacitors to be greater than a/the supply voltage across the battery.

Optionally, the apparatus comprises a controller arranged to detect a supply voltage across the battery and to initiate operation of the DC-DC converter upon detecting that the supply voltage across the battery is below a threshold. This threshold is preferably that relating to the battery being unable to operate a starter motor and is preferably at least 4V, more preferably at least 7V, yet more preferably at least 10V.

Preferably, the one or more capacitors are each an electrolytic capacitor or a supercapacitor. Preferably, the one or more capacitors have a combined storage capacity of at least 3 kilojoules, preferably of at least 10 kilojoules, more preferably between 10 kilojoules and 20 kilojoules. Preferably, the one or more capacitors have a combined capacitance of at least of 50 Farads, preferably of between 50 Farads and 100 Farads.

Preferably, the equivalent series resistance (ESR) of the apparatus is no greater than 5 milliohms, preferably no greater than 2 milliohm. Preferably, the ESR is the ESR at the time of discharging the capacitor—where there may also be provided a switch which enables discharging of the capacitor when in a conductive state.

Preferably, the battery is a vehicle battery.

Preferably, the one or more capacitors are arranged to supply a voltage to a load, preferably the load is a starter motor. The voltage may be provided to the load via the terminals of a vehicle battery.

Preferably, the one or more capacitors comprise a plurality of capacitors.

Preferably, the one or more capacitors are arranged to be alterably connected, wherein the connection between of the one or more capacitors is reversibly changeable between a parallel connection and a series connection.

Preferably, the one or more capacitors are arranged to be connected in parallel within a charging configuration. Preferably, of the one or more capacitors are arranged to be connected in series within a discharging configuration.

Optionally, the one or more capacitors comprises a subset of capacitors arranged to be alterably connected as described and a subset of capacitors arranged in a fixed configuration. This may comprise one or more capacitors arranged to be reversibly changed between a parallel connection and a series connection and one or more capacitors fixedly arranged in a parallel or series connection.

Preferably the capacitors comprise capacitors having different properties, preferably different capacitance values. There may be numerous capacitors with differing properties or specifications, where this may allow that jump starter to be rapidly modified to charge and discharge optimally in a range of situations.

According to another aspect of the present disclosure, there is provided a jump starter for a vehicle, the jump starter comprising an apparatus as described herein.

According to another aspect of the present disclosure, there is provided a method for charging one or more capacitors from a battery, the method comprising: coupling a DC-DC converter between the battery and the one or more capacitors so as to draw a supply current from the battery and to provide a charging voltage to the one or more capacitors; detecting a supply power drawn from the battery; and altering the supply current drawn from the battery by the DC-DC converter dependent upon the determined supply power.

According to another aspect of the disclosure herein, there is provided an apparatus for charging one or more capacitors from a battery, the apparatus comprising: a DC-DC converter coupleable between the battery and the one or more capacitors and arranged to draw a supply current from the battery and supply a charging current to the one or more capacitors; wherein the DC-DC converter is arranged to determine a charging power supplied to the one or more capacitors and to alter the charging current supplied to the one or more capacitors dependent upon the determined charging power.

According to yet another aspect of the present disclosure, there is provided a method for charging one or more capacitors from a battery, the method comprising: coupling a DC-DC converter between the battery and the one or more capacitors so as to draw a supply current from the battery and to provide a charging voltage to the one or more capacitors; detecting a charging power supplied to the one or more capacitors; and altering the charging current supplied to the one or more capacitors dependent upon the determined charging power.

Preferably, the capacitors used are comprised of nanocarbon containing electrodes and ionic liquid electrolytes. Optionally, the capacitors used may have a composition, or include technologies, similar to, or equivalent to, those described in the U.S. Pat. Nos. 8,817,452, 9,774,201, US2018218847, US2017/338053, US2017/155265, or GB2532246, the teachings of which are wholly incorporated herein by reference.

An implementation of the apparatus described herein is a device that harvests the reserve energy from a partially depleted starting battery to charge a supercapacitor. The stored energy may then be used to operate a starter motor (which is usable to turn over an engine). Once the engine is started, electrical energy is supplied from an alternator which may then recharge the battery. This implementation takes advantage of the fact that even a depleted battery, which is unable to provide sufficient current/voltage to operate a starter motor, may contain some energy. This remaining energy, once transferred to a supercapacitor, may be discharged as a short burst of high voltage/current energy, which is sufficient to operate the starter motor. This described implementation would not be limited to a vehicle battery, instead being applicable to any battery system that is used with a starter motor.

An implementation as described above may comprise two main stages. The first stage is determining the optimal current at which to charge the capacitor—the optimal current preferably being that which minimises the charging time. This process may progress in an iterative manner, continually adjusting the energy harvesting system parameters to maintain the maximum power. The electrical system may store this harvested energy in the capacitor bank and the process may continue until the amount of energy stored is at least that adequate to operate the starter.

The second stage is related to discharging the energy in an optimal manner. An electronic system may monitor the battery to determine if an attempt to operate the starter has occurred. This may be achieved by comparing the voltage on the battery over a period of time to determine if a load has been added to the battery. When an attempt is detected, the capacitor energy store may be connected by a high current switching device to the electrical system to provide the power required to turn over the engine.

The described system may be detachable and lightweight for portability and automatic for ease of use.

The disclosure extends to any novel aspects or features described and/or illustrated herein. Apparatus aspects may be applied to method aspects, and vice versa. Furthermore, any, some and/or all features in one aspect can be applied to any, some and/or all features in any other aspect, in any appropriate combination.

It should also be appreciated that particular combinations of the various features described and defined in any aspects of the disclosure can be implemented and/or supplied and/or used independently.

As used herein, means plus function features may be expressed alternatively in terms of their corresponding structure, such as a suitably programmed processor and associated memory, for example.

Aspects and embodiments of the disclosure are set out in the appended claims. These and other aspects and embodiments of the disclosure are also described herein.

At least one embodiment is now described, by way of example only, with reference to the accompanying drawings:

DETAILED DESCRIPTION

Figure 1:
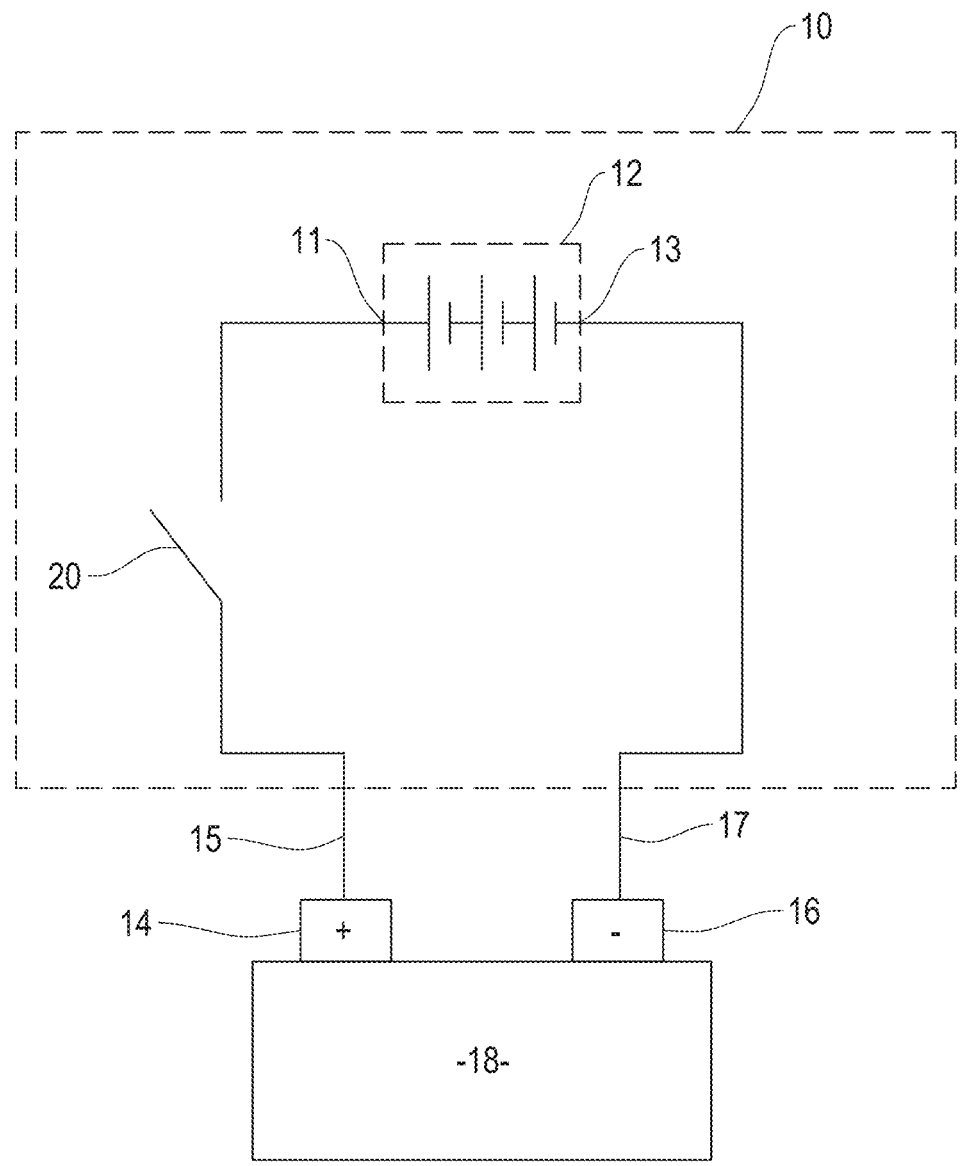
FIG. 1 is an illustration of a jump starter according to the prior art.

Referring to FIG. 1, a jump starter 10 according to the prior art comprises a supplementary battery 12 with a positive terminal 11 coupled to a positive connector 15 via a switch 20 and a negative terminal 13 coupled to a negative connector 17. The positive connector 15 of the jump starter 10 is coupleable to a positive terminal 14 of a vehicle battery 18 and the negative connector 17 of the jump starter 10 is coupleable to a negative terminal 16 of the vehicle battery 18. Typically, the positive connector 15 and the negative connector 17 each comprise an electrically conductive clip for physically clasping the positive and negative terminals 14, 16 of the vehicle battery 18 respectively. The clips, or electrical cables associated with the clips, are usually coloured to distinguish the clips from one another, e.g. red for positive and black for negative. This assists a user in correctly connecting the clips to the positive and negative terminals 14, 16.

When the vehicle battery 18 is partially or entirely depleted, the jump starter 10 is used to boost the vehicle battery 18. A user connects the positive connector 15 of the jump starter 10 to the positive terminal 14 of the vehicle battery 18 and connects the negative connector 17 of the jump starter 10 to the negative terminal 16 of the vehicle battery 18. When the switch 20 is closed, that is when the switch 20 is in a conducting state, electric current is able to flow, via the first connector 15 and the second connector 17, between the supplementary battery 12 of the jump starter 10 and the vehicle battery 18.

The supplemental battery 12 of the jump starter 10 must be charged before the jump starter 10 is used. Charging is performed by connecting the supplemental battery 12 to a battery charger (not shown). Typically, electrical power is provided to the battery charger from an electricity supply infrastructure, e.g. by plugging the battery charger into a wall socket. A user must remember to charge the supplemental battery 12 after the jumper starter 10 has been used. Indeed, the charging must be performed regularly even if the jump starter 10 is not used, as most conventional batteries suitable for use as the supplemental battery 12 lose charge over time even when no load is applied to them. Often users forget to charge the supplemental battery 12. This results in the jump starter 10 not being available for use when needed. Moreover, it can take some considerable time for the battery charger to charge the supplemental battery 12, e.g. several hours. This can be inconvenient and even frustrating for the user.

Figure 2:
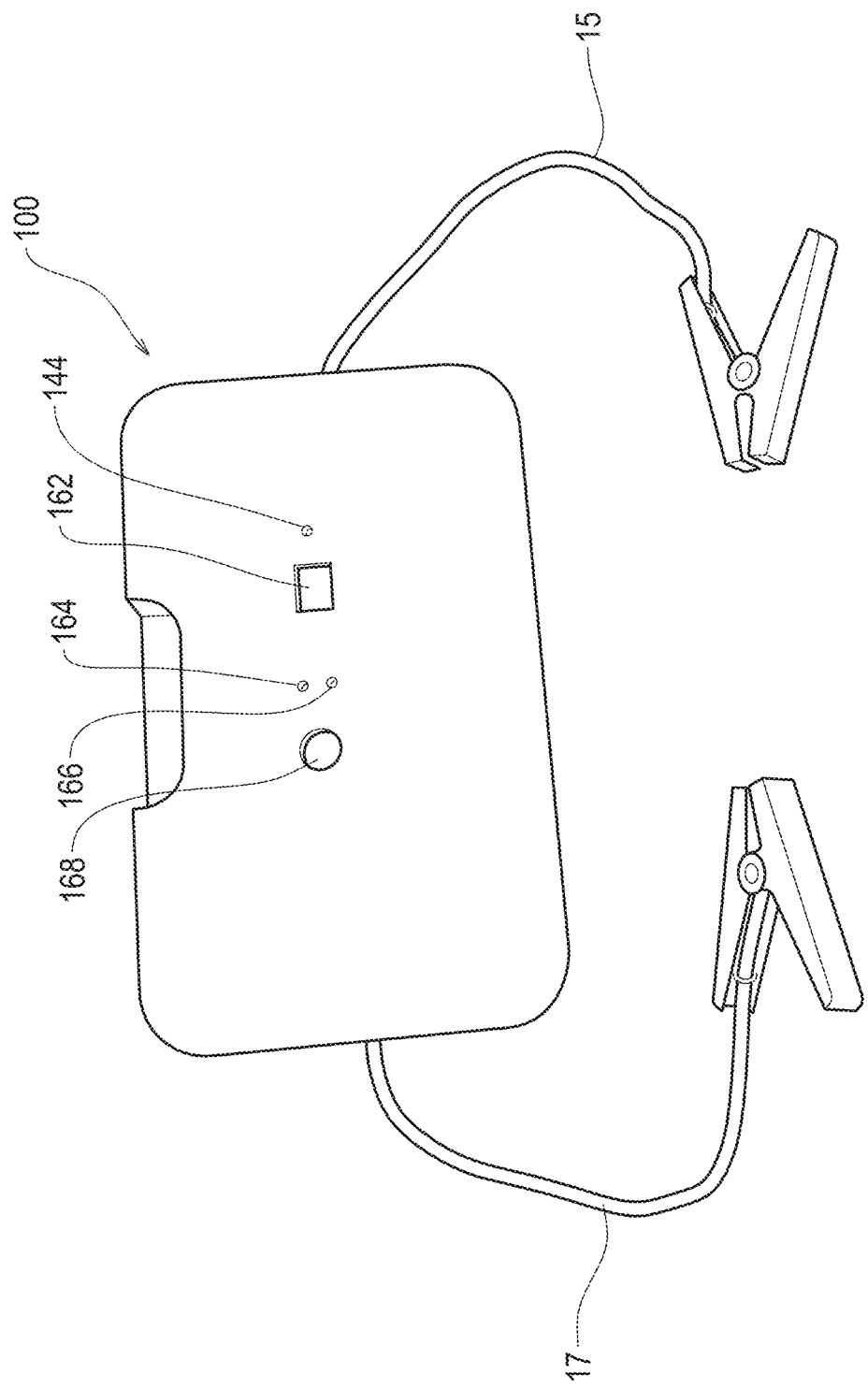
FIG. 2 is an illustration of a jump starter according to an embodiment of the present disclosure.
Figure 3:
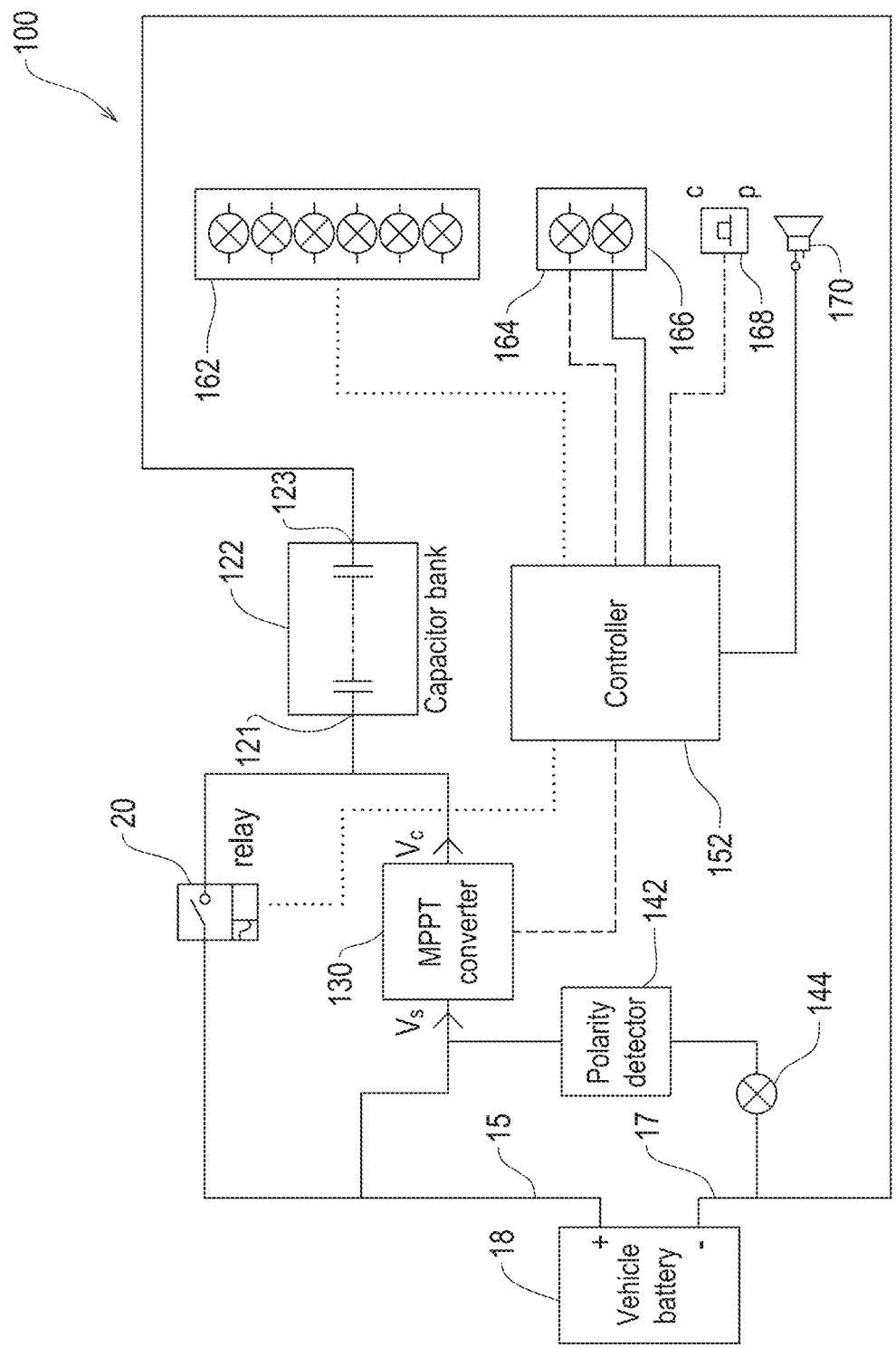
FIG. 3 is an illustration of some of the components of the jump starter shown in FIG. 2.

Referring to FIGS. 2 and 3, a jump starter 100 according to an illustrated embodiment of the present disclosure is able to draw electrical energy from the vehicle battery 18 when the vehicle battery 18 in a partially depleted state, and then output the electrical energy with greater electrical power than the vehicle battery 18 in its partially depleted state. The jump starter 100 according to the embodiment of the present disclosure has the positive connector 15 coupleable to the positive terminal 14 of the vehicle battery 18 via the switch 20 and the negative connector 17 coupleable to the negative terminal 16 of the vehicle battery 18. However, instead of the supplemental battery 12, the jump starter 100 of the illustrated embodiment has a capacitive store 122.

The capacitive store 122 is able to charge and discharge more rapidly than a conventional battery. This means that the capacitive store 122 can be charged from the vehicle battery 18 over a short time period, typically a few minutes. It also means that the capacitive store 122 can deliver a relatively large electrical current, albeit for a relatively short period of time, in comparison to a typical battery that may be used as the vehicle battery 18, when that vehicle battery 18 is in a partially depleted state. This remains the case even though the vehicle battery 18 may store the same or even a much greater amount of electrical charge than the capacitive store 122, even when the vehicle battery 18 is in its partially depleted state. Of assistance in the capacitive store 122 being able to provide higher electrical current than the vehicle battery 18 is that the capacitive store 122 has lower internal resistance than the vehicle battery 18.

In some embodiments the capacitive store 122 of the jump starter 100 is a single capacitor. Typically, the capacitor is a supercapacitor. In the present embodiment the capacitive store 122 comprises multiple capacitors, e.g. it is a bank of capacitors. The capacitors of the capacitive store 122 are coupled to one another in parallel, so as to increase the amount of electrical charge that can be stored by the capacitive store 122 without increasing the voltage across the capacitive store 122 when in a fully charged state. Again, the capacitors are typically supercapacitors. In other embodiments, the capacitors of the capacitive store 122 are connected in series.

In this embodiment, the capacitive store 122 is capable of storing more electrical energy than is required to operate a starter motor of a typical car. This generally means that the capacitive store 122 has a capacitance larger than 50 Farads. Typically, the capacitive store 122 has a capacitance larger than 100 Farads, as this usually allows the starter motor to be operated multiple times before the capacitive store 122 needs to be recharged. It also accommodates starting a typical car in very cold environmental conditions, such as below 0° C., when more electrical energy may be required.

Considering now the other features of the jump starter 100 of the illustrated embodiment, the jump starter 100 has a polarity detector 142 arranged to detect whether the jump starter 100 is incorrectly connected to the vehicle battery 18, e.g. if the positive connector 15 is coupled to the negative terminal 16 of the vehicle battery 18 and the negative connector 17 is coupled to the positive terminal 14 of the vehicle battery 18. The polarity detector 142 is coupled to a reverse polarity indicator 144. The reverse polarity indicator 144 is arranged to activate when the polarity detector 142 detects that the jump starter 100 is incorrectly connected to the vehicle battery 18. In this embodiment, the reverse polarity detector 142 and the reverse polarity indicator 144 are coupled in series between the positive connector 15 and the negative connector 17 of the jump starter 100. The polarity detector 142 is a diode arranged to prevent electrical current flowing when the positive connector 15 is connected to the positive terminal 14 of the vehicle battery 18 and the negative connector 17 is connected to the negative terminal 16 of the vehicle battery 18 and to allow electrical current to flow when the positive connector 15 is connected to the negative terminal 16 of the vehicle battery 18 and the negative connector 17 is connected to the positive terminal 16 of the vehicle battery 18. The reverse polarity indicator 144 is a Light Emitting Diode (LED) that illuminates when current flows through it, e.g. when the positive connector 15 is connected to the negative terminal 16 of the vehicle battery 18 and the negative connector 17 is connected to the positive terminal 16 of the vehicle battery 18. In other embodiments, the reverse polarity indicator 144 is a speaker that outputs an audible signal or a display that presents a visual indication. In some embodiments, the polarity detector 142 and the reverse polarity indicator 144 are combined, for example the functions of both of these components may be implemented in a single LED.

The jump starter 100 has a DC-DC converter, more specifically a Maximum Power Point Tracking (MPPT) converter 130 coupled between the positive connector 15 of the jump starter 100 and a first terminal 121 of the capacitive store 122. A second terminal 123 of the capacitive store 122 is coupled to the negative connector 17 of the jump starter 100 and, with the positive and negative connectors 15, 17 correctly coupled to the positive and negative terminals 14, 16 of the vehicle battery 18, and the switch 20 open, that is in a non-conductive state, the MPPT converter 130 is arranged to deliver electrical energy from the vehicle battery 18 to the capacitive store 122.

The MPPT converter 130 is a Direct Current to Direct Current (DC to DC) voltage converter. The MPPT converter 130 is arranged to have as an input the voltage supplied by the vehicle battery 18, referred to as the supply voltage $V_S$, and the current supplied by the battery 18, referred to as the supply current $I_S$ and to produce as an output a charging voltage $V_C$ and a charging current $I_C$. The supply voltage $V_S$ and the charging voltage $V_C$ are usually different to one another. The supply voltage $V_S$ varies over time as the amount of electrical charge stored in the vehicle battery 18 varies. The MPPT converter 130 is arranged to draw a supply current $I_S$ from the vehicle battery 18 and to provide a charging current $I_C$ to the capacitive store 122. The MPPT converter 130 is arranged to provide a charging current $I_C$ at a level within an operating range that usually spans voltages higher and lower than the supply current $I_S$. In order to do this, the MPPT converter 130 is capable of altering the supply current $I_S$ drawn. More specifically, the MPPT converter 130 is operable to step down the supply current $I_S$ and also operable to step up the supply current $I_S$. The MPPT converter 130 is arranged to either step up or step down the supply current $I_S$ depending upon the level of the supply current $I_S$ and the desired charging current $I_C$ at any given time.

The MPPT converter 130 is similarly arranged to alter the supply voltage $V_S$ to provide a charging voltage $V_C$. In typical embodiments, altering the supply voltage $V_S$ also alters the supply current $I_S$ (as the supply power is constant) so that any method of altering current may also be considered a method of altering voltage and vice versa.

The switch 20 is provided in parallel with the MPPT converter 130, coupled between the positive connector 15 of the jump starter 100 and the first terminal 121 of the capacitive store 122. When the switch 20 is closed, that is when the switch 20 is in a conductive state, an electrical path is provided between the positive connector 15 and the first terminal 121, parallel to the MPPT converter 130. This allows the MPPT converter 130 to be bypassed. Since the capacitive store 122 remains coupled between the positive connector 15 and the negative connector 17 of the jump starter 100 with the same polarity as it is coupled between the positive connector 15 and the negative connector 17 via the MPPT converter 130, discharge of the capacitive store 122 supplements the vehicle battery 18. More specifically, when a user attempts to start the engine, the starter motor is able to draw current from the capacitive store 122 via the terminals of the vehicle battery 18.

A controller 152 of the jump starter 100 is arranged to communicate with the MPPT converter 130 and the switch 20. This allows the controller 152 to receive indication signals from the MPPT converter 130, which indication signals provide information to the controller 152. It also allows the controller 152 to send control signals to the MPPT converter 130 and the switch 20. The controller 152 is further arranged to communicate with a charge display 162, ready indicator 164, an armed indicator 166, an arming switch 168, and a speaker 170.

The controller 152 is arranged to determine the amount of charge stored by the capacitive store 122. The controller 152 is arranged to generate an indication of the amount of charge and to output a signal to the charge display 162, which in turn is arranged to display a representation of the charge stored by the capacitive store 122 based on the indication. In the illustrated embodiment, the charge display 162 is an LED display arranged to display a number, which number is an amount of kJ of electrical energy stored by the capacitive store 122.

The controller 152 is also arranged to compare the amount of charge to a threshold. The threshold may be set by the user. When the amount of charge exceeds the threshold, the controller 152 is arranged to output an indication that the jump starter 100 is ready to use. The indication is output to the ready indicator 164 and, in response to receiving the indication that the jump starter 100 is ready to use, the ready indictor 164 outputs an indication that the jump starter 100 is ready to use. In the illustrated embodiment, the ready indicator 164 is an LED, which LED is arranged to illuminate to indicate that the jump starter 100 is ready to use.

The speaker 170 is arranged to supplement the ready indicator 164. The controller 152 is arranged to output the indication that the jump starter 100 is ready to use to the speaker 170 at the same time as it is output to the ready indictor 164. In response to receiving the indication that the jump starter 100 is ready to use, the speaker 170 outputs an audible sound signal. This enables the user to be alerted to the jump starter 100 being ready to use without having sight of the ready indicator 164 or even the jump starter 100 as a whole. This may be useful, for example, when a user leaves the jump starter 100 connected to the vehicle battery 18 near the vehicle engine or elsewhere in the vehicle whilst themselves being positioned in the driver's seat to operate the vehicle.

As the electrical current that can be output by the jump starter 100 depends on the effective resistance of the jump starter 100, the jump starter 100 of the illustrated embodiment is arranged to have an Effective Series Resistance (ESR) of less than or equal to 5 milliohms. In other embodiments, an ESR of less than 2 milliohms is provided. The ESR is the resistance of the electrical path between the positive connector 15 and the negative connector 17 via the switch 20 and the capacitive store 122 when the switch 20 is closed.

In a particularly preferred embodiment, the capacitive store 122 has a capacitance of 130 F, the MPPT converter 130 is arranged to step up the supply voltage $V_S$ to a charging voltage $V_C$ of 16V and the ESR of the jump starter 100 is less than 2 milliohms. With the capacitive store 122 fully changed to the charging voltage $V_C$ of 16V, it stores 19.2 kJ of electrical energy (=0.5×capacitance×charging voltage $V_C$ squared). This allows the capacitive store 122 to discharge 11.7 kJ of electrical energy before the voltage across the capacitive store drops to 10V, which is the voltage below which a starter motor typical does not operate. This is a discharge of approximately 700 A for around 0.8 seconds.

In operation, a user first connects the positive connector 15 of the jump starter 100 to the positive terminal 16 of the vehicle battery 18 and the negative connector 17 to the negative terminal 16 of the vehicle battery 18.

In the event that the user erroneously connects the positive connector 15 of the jump starter 100 to the negative terminal 16 of the vehicle battery 18 and the negative connector 17 to the positive terminal 16 of the vehicle battery 18, electrical current from the vehicle battery 18 flows through the reverse polarity detector 42 and the reverse polarity indicator 44, causing the reverse polarity indicator 44 to indicate that the positive and negative connectors 15, 17 are connected erroneously. This should prompt the user to re-connect the positive and negative connectors 15, 17 correctly.

When the positive and negative connectors 15, 17 have been connected to the positive and negative terminals 14, 16 of the vehicle battery 18 correctly, the supply voltage $V_S$ is provided to the MPPT converter 130 by the vehicle battery 18.

Figure 4:
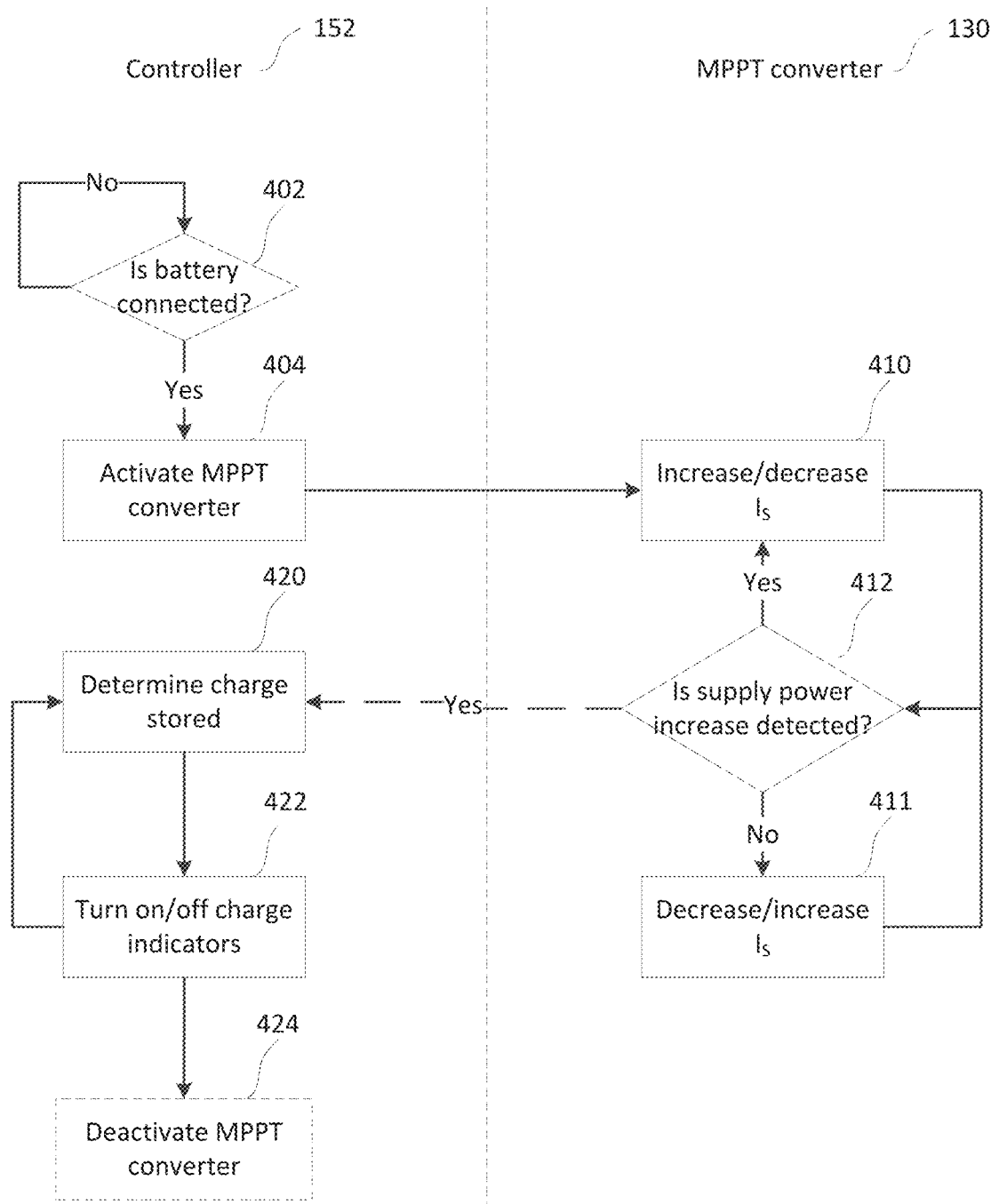
FIG. 4 is a flow chart illustrating a charging procedure for the jump starter shown in FIG. 2.

Referring to FIG. 4, the controller 152 initially monitors, at step 402, whether the positive and negative connectors 15, 17 have been connected to the vehicle battery 18. In some embodiments this involves continuously, or periodically, attempting to draw a small current through the positive and negative connectors 15, 17. In some embodiments there is some form of user input, such as a button, which a user can press to prompt an attempt to draw a small current through the positive and negative connectors 15, 17; if this attempt is successful, an output means, such as an LED or a speaker will indicate that a battery is connected. In the illustrated embodiment the controller 152 determines that the positive and negative connectors 15, 17 have been connected to the vehicle battery 18 when a threshold supply voltage is detected across the MPPT converter 130. Upon this detection the MPPT converter 130 is arranged to send an indication to the controller 152.

In response to the supply voltage $V_S$ being applied, the controller 152 activates the MPPT converter 130, at step 404. Upon activation, the MPPT converter 130 adjusts, at step 410, the supply current $I_S$ being drawn from the vehicle battery, alters, e.g. steps up the drawn supply current $I_S$, and provides the altered current to the capacitive store 122 as the charging current $I_C$.

The MPPT converter 130 adjusts the drawn supply current $I_S$ to maximise the supply power $P_S$ extracted from the battery 18, this operating condition also maximises the charging power $P_C$ provided to the capacitive store 122, and thereby the rate at which the capacitive store 122 is charged.

To determine the optimal supply current $I_S$, the MPPT converter 130 alters the drawn supply current $I_S$ by first drawing a supply current $I_S$ of 0 Amperes. The MPPT converter 130 then increases, in increments, at step 410, the drawn supply current $I_S$ while detecting a supply power $P_S$, which is equal to the product of the supply voltage $V_S$ and the supply current $I_S$ being drawn from the vehicle battery 18 ($P_S = V_S \times I_S$). The supply current $I_{S,MAX}$ at which maximum power is extracted from the vehicle battery 18 is that towards which the MPPT adjusts the drawn supply current $I_S$.

The supply power $P_S$ from the vehicle battery 18 is determined using, as above, the equation $P_S = V_S \times I_S$. The point of maximum supply power $P_S$ is also the point of maximum charging power $P_C$, where the charging power $P_C$ is the product of the charging voltage $V_C$ and the charging current $I_C$—so that the point of optimal supply current $I_S$ may also be determined by measuring the charging variable $V_C$, $I_C$. The maximum charging power $P_C$ occurs at the point of maximum supply power $P_S$.

After each increment in current, the MPPT converter 130 determines the supply power $P_S$ being drawn from the vehicle battery 18 and compares this to the preceding determined supply power $P_S$. If the supply power $P_S$ is detected, in step 412, to be increasing, the MPPT converter 130 continues to increase the drawn supply current $I_S$. When the MPPT converter 130 detects, at step 412, a decreasing supply power $P_S$, the MPPT converter 130 stops increasing the drawn supply current $I_S$ and begins decreasing, at step 411, the drawn supply current $I_S$. The MPPT converter 130 continues to periodically detect, at step 412, whether the supply power is increasing, and once the supply power $P_S$ is detected to be decreasing, the MPPT converter 130 begins to, once again, increase the drawn supply current $I_S$. This process continues, with the MPPT converter 130 switching between increasing and decreasing the drawn supply current $I_S$ whenever it is detected that the power has begun to decrease instead of increase.

Altering the drawn supply current $I_S$ in this way is useable to obtain the maximum—or at least a near maximum—drawn supply power $P_S$. This maximum extractable power is dependent upon the internal resistance of the battery 18, which depends on numerous factors, such as the state of the battery 18, the current temperature, and the supply current $I_S$ being drawn from the battery, so that the power extracted may change non-linearly in response to changes in the current drawn by the MPPR converter 130.

In some embodiments, the charging current $I_C$ is equal to the supply current $I_S$ multiplied by the ratio of the supply voltage to the charging voltage:

$$I_C = I_S * \frac{V_S}{V_C} \quad (1)$$

Since the variables are connected in this way, the adjusting of the drawn supply current $I_S$ is comparable to an adjustment of the drawn charging current $I_C$.

The increasing or decreasing of the supply current $I_S$ occurs in increments or decrements. The time period between these increments or decrements differs in various embodiments. Preferably, the time period is less than 1 second, more preferably less than 0.1 seconds. The magnitude of these increments or decrements also differs in various embodiments. Preferably, the increment/decrement magnitude is less than 0.5 A, more preferably less than 0.1 A.

The supply current $I_S$ is altered by the MPPT converter 130 to obtain a charging current $I_C$, which corresponds to a charging voltage $V_C$. The MPPT converter 130 preferably alters the supply current $I_S$ so that the charging voltage $V_C$ applied to the capacitive store 122 is, at all times, the maximum desired capacitor voltage $V_{CAP,\ MAX}$. In this embodiment, this voltage $V_{CAP,\ MAX}$ is 16V. The capacitive store 122 will charge up to this voltage.

In some embodiments, the charging current $I_C$ applied to the capacitive store 122 is altered to achieve a charging voltage $V_C$ that maximises charging current $I_C$. In these embodiments, the charging voltage $V_C$ depends on the voltage $V_{CAP}$ across the capacitive store 122.

The voltage $V_{CAP}$ across the capacitive store 122 can be defined by $$V_{CAP} = Q_{STORED}/C \quad (2)$$

$V_{CAP}$ being the voltage across the capacitive store 122;
$Q_{STORED}$ being the charge stored by the capacitive store 122; and
C being the capacitance of the capacitive store 122.

As the charging current $I_C$ is applied to the capacitive store 122, the capacitive store 122 charges and the voltage $V_{CAP}$ across the capacitive store 122 increases. Indeed, after some time, all else being equal, the voltage $V_{CAP}$ across the capacitive store 122 would increase to the same level as the charging voltage $V_C$. However, once the voltage $V_{CAP}$ across the capacitive store 122 is equal the charging voltage $V_C$, the current output by the MPPT converter 130 to the capacitive store 122 decreases and the charging power $P_C$ decreases. Subsequently the MPPT converter 130 determines, at step 412, that the charging power $P_C$ is no longer increasing and 130 increases the charging current $I_C$.

As the capacitive store 122 is, at least in most cases, initially uncharged, the initial level of the voltage $V_{CAP}$ across the capacitive store 122 is usually 0V or close to 0V. The vehicle battery 18, even when partially depleted, will normally have a voltage in excess of 8V. When the vehicle battery 18 is healthy and fully charged, it should typically be capable of supplying a voltage of approximately 12.6V. As a result, in most cases, the MPPT converter 130 initially alters the supply current $I_S$ such that the provided charging voltage $V_C$ is less than the supply voltage $V_S$.

As the capacitive store 122 becomes charged, the amount of charge stored $Q_{STORED}$ by the capacitive store 122 increases and the voltage $V_{CAP}$ across the capacitive store 122 increases. Eventually, the voltage $V_{CAP}$ across the capacitive store 122 may reach the same level as the level of the supply voltage $V_S$. When this occurs, the MPPT converter 130 starts to alter the supply current $I_S$ such that the provided charging Voltage $V_C$ is greater than the supply voltage $V_S$.

During the charging of the capacitive store 122, the controller 152 determines, at step 420, the amount of charge $Q_{STORED}$ stored by the capacitive store 122. Depending upon the determination, at step 422, the controller 152 sends the indication of the amount of charge $Q_{STORED}$ stored by the capacitive store 122 to the charge display 162. The controller 152 also outputs the indication that the jump starter 100 is ready to use via the ready indicator 164 depending upon the comparison of the determined amount of the charge $Q_{STORED}$ stored by the capacitive store 122 to the threshold.

In some embodiments, the indication of the amount of charge is a remaining time to charge. In some embodiments, the indication of the amount of charge is an indication of the Farads stored by the capacitive store 122.

In this embodiment, when there is sufficient charge to operate the jump starter 100, the controller 152 deactivates the MPPT converter 130. More generally, the controller 152 compares, at step 424, the amount of charge $Q_{STORED}$ stored by the capacitive store 122 to a threshold. When the amount of charge $Q_{STORED}$ stored by the capacitive store 122 exceeds the threshold, the controller 152 sends a control signal to the MPPT converter 130 to deactivate the MPPT converter 130. The threshold is preferably related to the charge required to operate the jump starter 100 and, in some embodiments, is set by a user.

Determining, at step 420, the charge $Q_{STORED}$ stored by the capacitive store 122 involves determining the voltage $V_{CAP}$ across the capacitive store 122. Rearranging equation 2 above, the charge $Q_{STORED}$ stored by the capacitive store 122 can be expressed as:

$$Q_{STORED} = V_{CAP} * C \quad (3)$$

In some embodiments, e.g. those where charging current $I_C$ is maximised, the voltage $V_{CAP}$ across the capacitive store 122 can be approximately determined by monitoring the charging voltage $V_C$ provided by the MPPT converter 130, as voltage $V_{CAP}$ across the capacitive store 122 is only ever slightly lower than the charging voltage $V_C$. More generally, $V_{CAP}$ can be accurately determined as the lowest charging voltage $V_C$ at which the capacitive store 122 draws a charging current $I_C$ that is greater than about 0 Amps. An approximation of $V_{CAP} = V_{C,low}$, where $V_{C,low}$ is the lowest charging voltage $V_C$ at which a current is drawn by the capacitive store 122 is then useable to obtain an approximate estimate of $Q_{STORED}$. The MPPT converter 130 is arranged to provide an indication of the charging voltage $V_C$ to the controller 152, and the controller 152 bases its determination of the charge $Q_{STORED}$ stored by the capacitive store 122 upon this indication.

In some embodiments, there is arranged a voltmeter, or other means of determining voltage, connected across the capacitive store 122. This voltmeter is arranged to determine the voltage $V_{CAP}$ across the capacitive store 122 and provide an indication of the voltage $V_{CAP}$ across the capacitive store 122 to the controller 152. This method of determining the voltage $V_{CAP}$ across the capacitive store 122 may be more accurate than relying upon a determination of the charging voltage $V_C$.

In some embodiments, the MPPT converter 130 may not initially set the drawn supply current $I_S$ to 0 A. In some embodiments, there may be a maximum drawn supply current $I_S$ beyond which the MPPT converter 130 no longer increases the drawn supply current $I_S$.

In some embodiments, a 'charge pump' (or a similar system) is used, wherein the capacitors within the capacitive store 122 are charged in parallel and discharged in series. This may be achieved by the opening and closing of switches arranged between the capacitors of the capacitive store 122. This enables a discharging voltage to be achieved that is larger than the charging voltage.

Referring to FIG. 7, there is shown an embodiment of the capacitive store 122 that comprises a charge pump. While this example shows a relatively simple implementation, it will be appreciated that in practice a more complex configuration could be used. Arrows are provided on FIG. 7 to indicate exemplary flows of current.

Within the embodiment of FIG. 7, there are provided four capacitors 72, each capacitor having a corresponding connection switch 73. The connection switches 73 are arranged so that when they are closed, the capacitors 72 are connected in series and when the connection switches 73 are open, the capacitors 72 are connected in parallel.

There is further provided two charging switches 74, when closed the charging switches connect the first terminal 121 of the capacitive store 122 to a ground terminal 81 via the capacitors 72. The capacitive store 122 is arranged to receive, via the first terminal 121, a charging voltage $V_C$ which passes through each of the capacitors 72 to the ground terminal 81. In some embodiments, this ground terminal is related to a clip of the jump starter 100, e.g. a clip may be connected to a grounded component of the vehicle.

A discharging switch 75 is provided, when closed the discharging switch 75 is arranged to connect the capacitors 72 to the second terminal 121 of the capacitive store 122. The capacitive store 122 is arranged to provide, via the second terminal, a discharging voltage.

In the embodiment of FIG. 7, there is further provided an excess capacitor 77. This excess capacitor 77 provides, for example: increased redundancy, e.g. it may be used if one of the capacitors 72 malfunctions, and improved flexibility.

The excess capacitor 77 enables use of different configurations as may be appropriate for different uses. This excess capacitor 77 may be connected in parallel to the other capacitors 72 by closing expansion switches 78. The excess capacitor may be connected in series to the other capacitors by closing an excess expansion switch 79 and opening an excess expansion switch 80 is opened.

Including the excess capacitor 77 within the charge pump provides greater energy storage capacity, and accordingly a greater discharge voltage. This is useful for large vehicle batteries and/or vehicles for which the starter motor requires a large current draw.

Figure 7A:
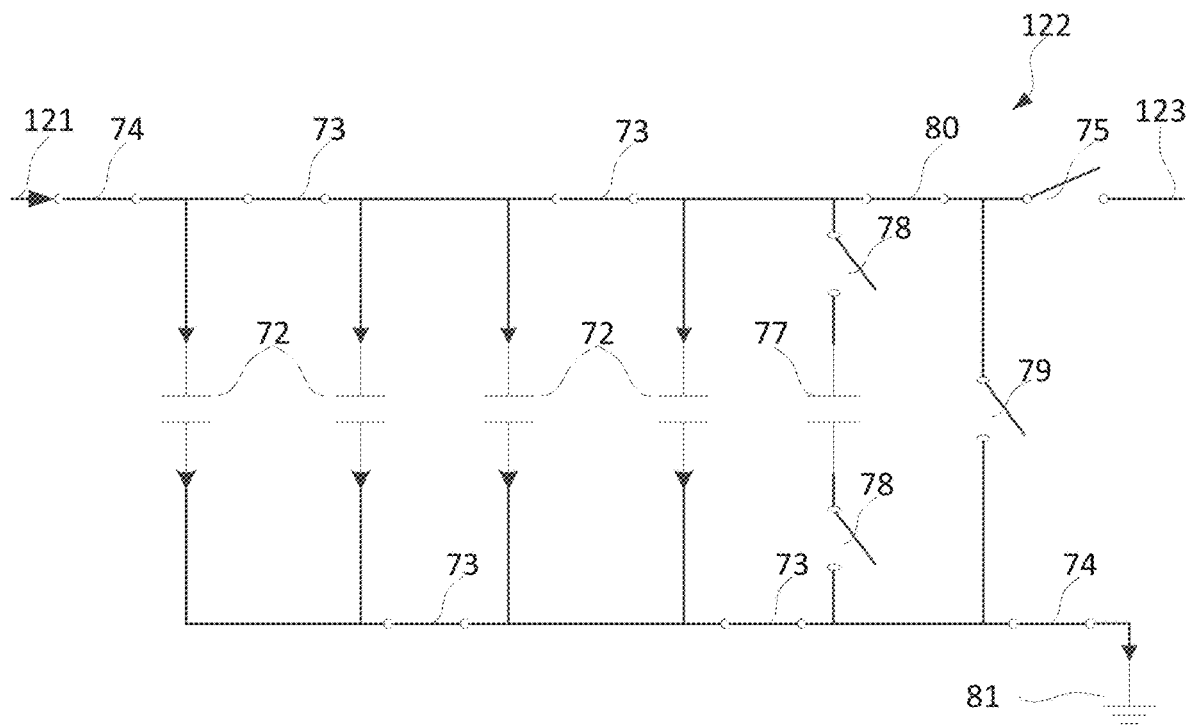
FIGS. 7 (*a*)-(*b*) are illustrations of an embodiment of the componentry of a capacitive store.

Referring to FIG. 7a, there is shown a charging configuration, where the capacitors 72 are connected in parallel. In this charging configuration, the four connection switches 73 are closed. Further, the charging switches 74 are closed, so that the capacitive store 122 is arranged to receive a charging voltage $V_C$ at the first terminal 121 of the capacitive store, this charging voltage $V_C$ is that which passes through each capacitor 72, thereby charging the capacitors 72 towards a voltage equal to the charging voltage $V_C$.

Figure 7B:
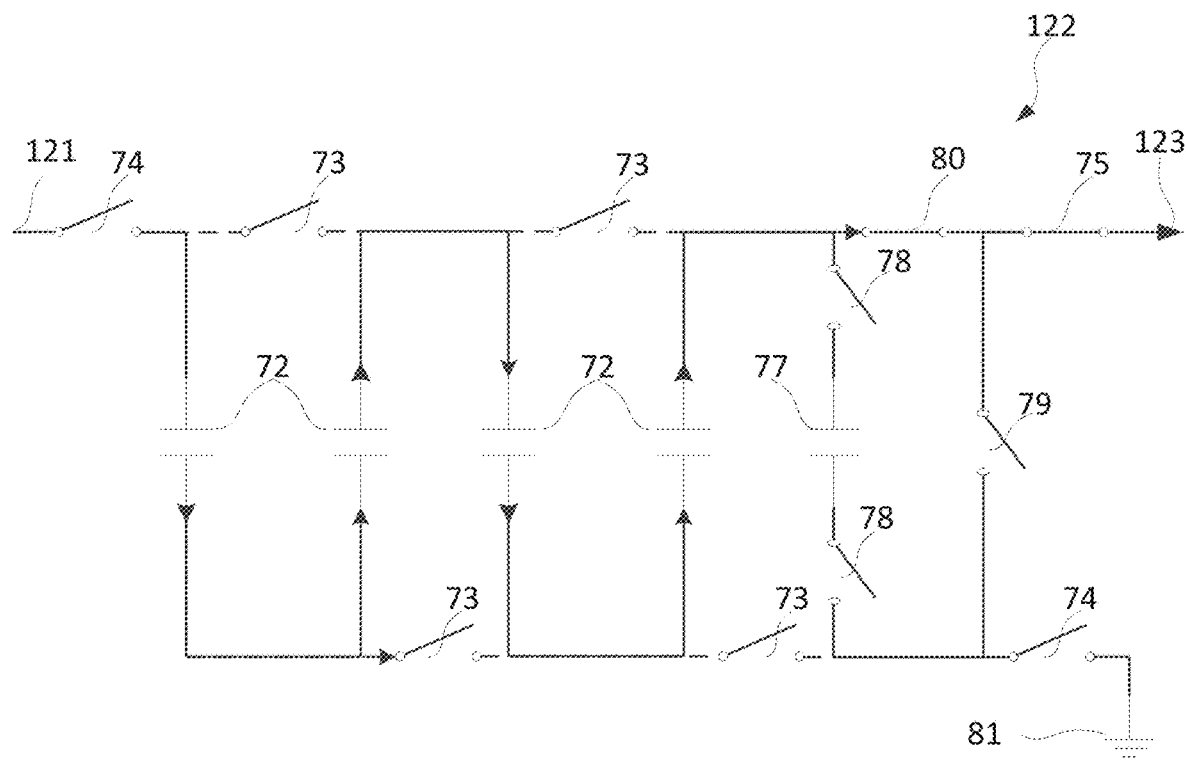

Referring to FIG. 7b, there is shown a discharging configuration, where the capacitors 72 are connected in series. The connection switches 73, which correspond to the four capacitors 72 are open; with the connection switches 73 open, the capacitors 72 are connected in series. The charging switches 74 are open, and a provided discharging switch 75 is closed, so that the capacitive store 122 is arranged to provide a discharging voltage/current to the vehicle battery 18 (and the starter motor) via the second terminal 123.

In operation, the capacitors are charged using the charging configuration of FIG. 7a and discharged using the discharging configuration of FIG. 7b. In this embodiment, four capacitors are provided, so that they may be charged to, for example, a charging voltage of 4V and then provide a voltage when discharging of 16V. Since a depleted battery is likely to hold greater than 4V, it would be capable of charging the capacitors 72 up to this voltage without being stepped up. The illustrated embodiment would therefore preclude any need for the MPPT converter to comprise, or to operate as, a step up converter. As will be readily appreciated, the number and size of capacitors could be varied to achieve a range of output voltages dependent upon the charging voltage $V_C$.

More specifically, in operation, to charge the capacitors 72 the connection switches 73 and the charging switches 74 are closed, and the discharging switch 75 is opened. A charging voltage $V_C$ is then provided at the first terminal 121. This charging voltage $V_C$ produces a charging current $I_C$ between the first terminal 121 and the ground terminal 81, which passes through, and charges, each capacitor 72. The capacitors 72 charge towards a voltage equal to the charging voltage $V_C$.

Once the capacitive store 122 is sufficiently charged, and/or once the user wishes to discharge the capacitive store 122, the capacitive store is adjusted so that the capacitors 72 are arranged in the discharging configuration of FIG. 7b. The connection switches 73 and the charging switches 74 are opened and the discharging switch 75 is closed. A current can then be drawn from the second terminal 123 by the vehicle battery 18 (or by a starter motor via the terminals of the vehicle battery 18). The discharging voltage is approximately equal to the sum of the voltages across each of the capacitors 72, so that if each of the capacitors 72 is fully charged before discharging the discharging voltage is approximately equal to, in this embodiment, four times the charging voltage $V_C$.

In this embodiment, at least the connection switches 73, charging switches 74, and discharging switch 75 are arranged to be opened/closed simultaneously. This may be achieved by connecting each switch to a single push switch, or to the controller 152. The charge pump is then switchable between the charging configuration and the discharging configuration over a short period, preferably effectively instantaneously.

In various embodiments, the conversion from the charging configuration to the discharging configuration occurs when a threshold stored charge $Q_{STORED}$ is reached, when the arming switch 168 is closed, or when the controller 152 closes the switch 20.

There is, in some embodiments, also an intermediate configuration, where each of the charging switches 74 are open and the discharging switch 75 are opened. In this configuration, the capacitors will remain in a constant state of charge, and will not leak charge. The discharging switch 75 may then be closed, for example, upon the arming switch 168 being closed. In these embodiment, the capacitive store 122 may be arranged to switch from the charging configuration of FIG. 1a to the intermediate configuration, from the intermediate configuration to the discharging configuration of FIG. 1b and then from the discharging configuration to the charging configuration.

In some embodiments, each capacitor 72 has corresponding inclusion switches comparable to the excess switches 78, 79, 80 of the excess capacitor 77 to enable that capacitor to be included/excluded from the charging and discharging configurations. This enables a range of possible configurations, where these may be selectable. In some embodiments, the capacitors 72, 77 vary in size, and/or properties, e.g. capacitance, to enable a suitable configuration to be used for a range of expected situations. As an example, high capacity capacitors are used with a coach battery, while smaller capacity capacitors are used with a car battery. This choice is preferably made dependent upon the supply voltage $V_S$ and/or charging voltage $V_C$ that is available, where capacitors are used with a capacity similar to, and slightly above, the available charging voltage $V_C$. In some embodiments, the configuration is selected dependent upon the capacity of the vehicle battery 18 and/or dependent upon a user selection, e.g. there may be provided a dial on the jump starter 10 which the user can turn to change the configuration of the capacitive store 122.

In some embodiments, the capacitors 72 used in each configuration are arranged to have a voltage rating that is substantially greater than the charging voltage placed across the capacitors 72. This ensures that any variations, e.g. higher voltages placed upon the capacitors 72 during discharging, do not damage the capacitors 72. In some embodiments, each capacitor 72 has a voltage rating greater, preferably greater by at least 1V, than the discharging voltage that occurs at the second terminal 123 when the capacitors are arranged in the discharging configuration and/or each capacitor 72 has a greater voltage rating than the load expected across that capacitor during discharge.

Some embodiments in which the capacitive store 122 comprises a charge pump use an alternative implementation of the MPPT converter 130, where the MPPT converter 130 is not capable of stepping up the supply voltage $V_S$. In some embodiments, the MPPT converter 130 is instead, or in addition, not capable of stepping down the supply voltage $V_S$. In some embodiments, the MPPT converter 130 is used solely to draw a maximum supply power $P_S$ from the vehicle battery 18. The corresponding supply voltage $V_S$ and supply current $I_S$ are supplied directly to the capacitive store, where $V_C=V_S$ and $I_C=I_S$. Such embodiments enable the provision of a simpler, cheaper, and smaller, jump starter 10.

Figure 5:
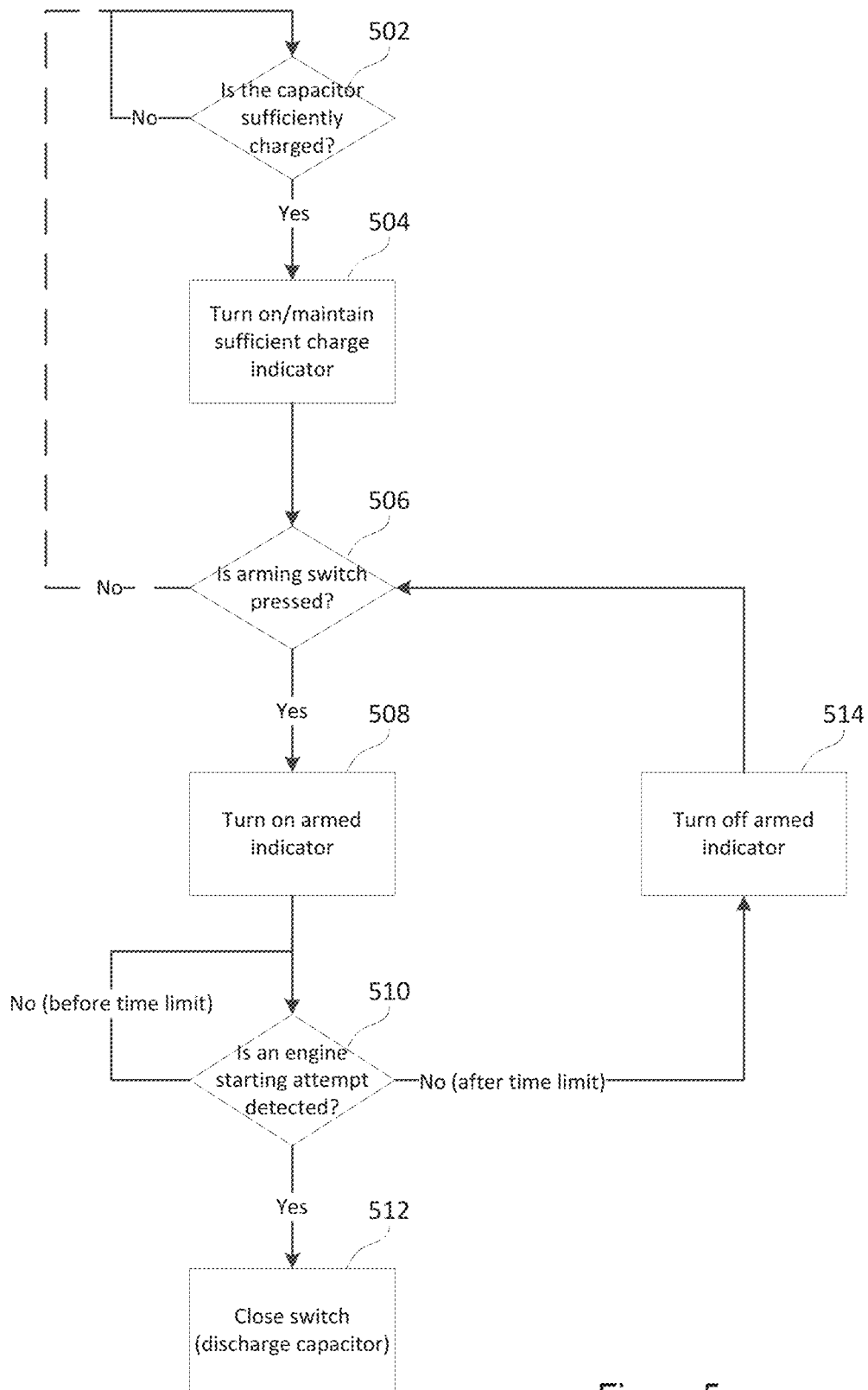
FIG. 5 is a flow chart illustrating a discharge procedure for the jump starter shown in FIG. 2.

Referring to FIG. 5, when the charge $Q_{STORED}$ stored by the capacitive store 122 is sufficient, the jump starter 100 is useable to supplement the electrical power provided by the vehicle battery 18 for the purpose of operating a starter motor.

The controller 152 monitors, at step 502, whether the charge $Q_{STORED}$ stored by the capacitive store 122 is above the threshold set by the user and, during the time that the charge $Q_{STORED}$ stored by the capacitive store 122 is above the threshold the controller 152, outputs the ready indication to the ready indicator 164. This causes the ready indicator 164 to indicate that the jump starter is ready for use.

When the user wishes to use the jump starter 100, the user activates the arming switch 168. The controller 152 detects the arming switch 168 being activated by the user at step 506 and, at step 508, sends an indication that the arming switch 168 has been activated to the armed indicator 166. This causes the armed indicator 166 to output the indication that the jump starter 100 is armed.

The controller 152 then monitors, at step 510, whether an engine starting attempt is made, e.g. if a load is applied across the vehicle battery 18. If such an attempt is detected, the switch 20 is closed 512, allowing the capacitive store 122 to discharge.

The load is, in various embodiments, detected by a threshold voltage draw being detected, a threshold voltage draw rate being detected, a threshold current draw being detected, a certain rate of change of voltage draw being detected, and/or a voltage draw through a certain location being detected (e.g. through the wires leading to the starter motor).

If no engine starting attempt is detected within a predetermined time limit, the controller 152 ceases to send the indication to the armed indicator 166 that the jump starter is armed, and the armed indicator 166 ceases to output the armed indicator, at step 514. The jump starter 100 is then effectively disarmed, and the controller 152 returns to monitoring the arming switch 168.

By returning the jump starter 100 to a disarmed state and requiring the arming switch 168 to be activated again, the possibility of a 'false positive', where the controller 152 closes the switch 20 due to an erroneous event is reduced. Additionally, as the operations performed by the controller 152 are decreased when the jump starter 100 is disarmed, as the controller 152 is not checking for an engine starting event, there is a reduced energy draw in this state.

By only discharging the capacitive store 122 when an engine starting attempt is detected, no electrical energy is wastefully supplied to the vehicle battery 18. If this system is not used, and the switch 20 is simply closed as soon as the arming switch 168 is activated, electrical energy would be transferred from the capacitive store 122 to the vehicle battery 18 as soon as the arming switch 168 is activated. This may result in the capacitive store 122 discharging before the load is applied across the vehicle battery 18, e.g. before the starter motor is activated. This may result in there not being sufficient electrical energy stored by the capacitive store 122 when the load is applied.

Figure 6:
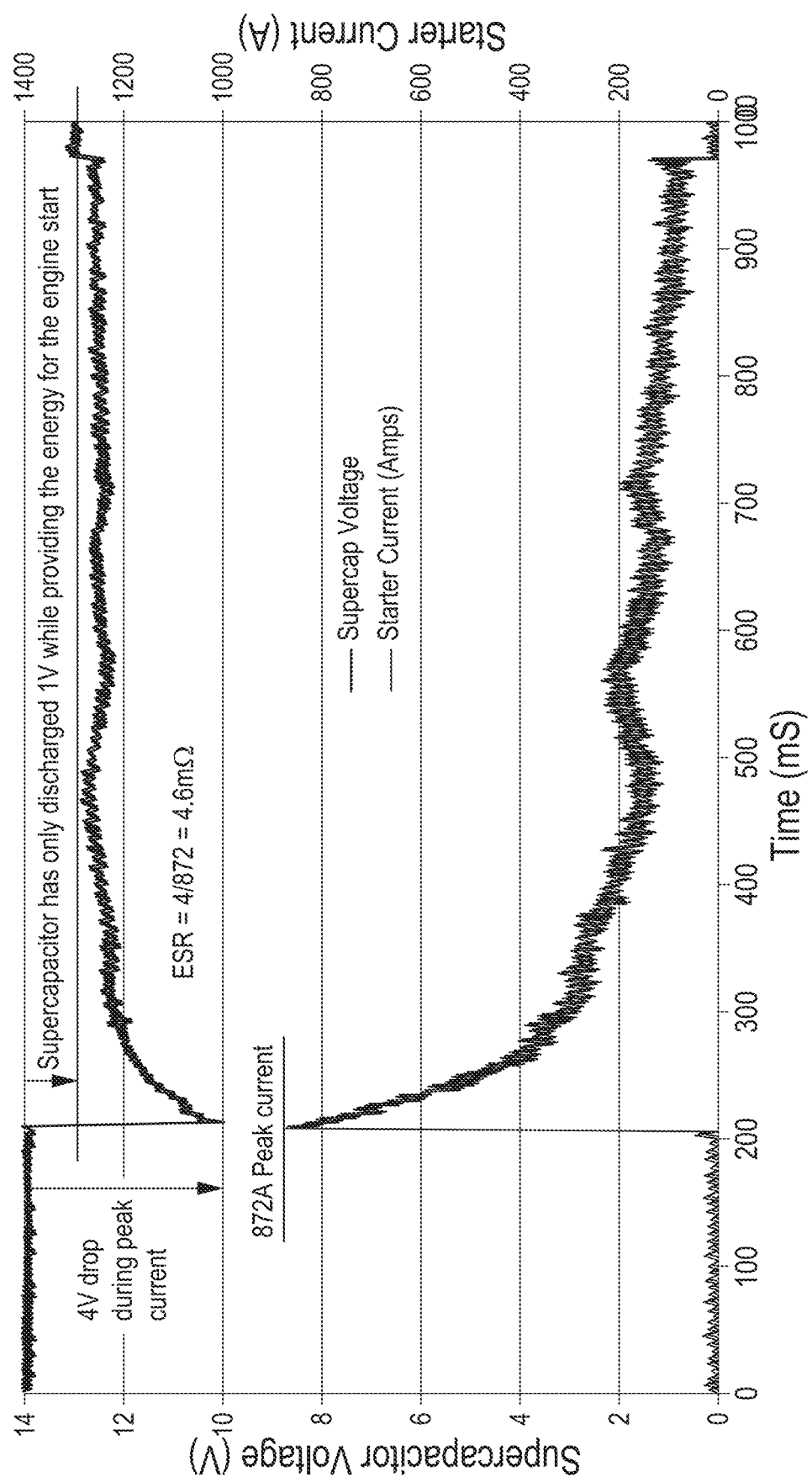
FIG. 6 is a graph of voltage and current against time during a starting event.

FIG. 6 is a graph of current and voltage against time during use of the jump starter 100 to supplement the vehicle battery 18, in its partially depleted state, during use of a starter motor to start the vehicle in which the vehicle battery 18 is mounted. In the embodiment represented in FIG. 6, the capacitive store 122 comprises a supercapacitor charged to approximately 14V. At a time of around 200 ms after the start of the time represented in the graph, a starting event occurs. It can be seen that, at the starting event, the supercapacitor provides a current of 872 amps at a voltage of 10V for a short period of time. The voltage provided by the supercapacitor is within 4V of the maximum voltage of the supercapacitor for the entire 800 ms period of the starting event shown in the graph.

ALTERNATIVES AND MODIFICATIONS

Any apparatus feature as described herein may also be provided as a method feature, and vice versa. Furthermore, as used herein, means plus function features may be expressed alternatively in terms of their corresponding structure.

It will be appreciated that particular combinations of the various features described and defined in any aspects can be implemented and/or supplied and/or used independently. In other words, any feature in a particular aspect may be provided independently and/or applied to other aspects, in any appropriate combination.

The jump starter 100 described within the detailed description may comprise any combination of the described components, where, in particular, the addition of a controller 152, an MPPT converter 130, or a capacitive store 122 as described herein may, in isolation, comprise an improvement to a conventional jump starter 10.

While the detailed description has considered the use of a capacitive store 122, any energy store could be used with the methods disclosed herein. A battery pack may be used instead of, or in conjunction with, the capacitive store 122, where the arming logic described herein may enable more efficient use of the stored charge and The MPPT converter 130 described herein may enable the energy store to be charged quickly, for example from a running engine.

While the detailed description has primarily considered the use of the jump starter 100 for a vehicle battery 18, this apparatus is usable for any equipment having a starter motor (in particular alongside an internal combustion engine). Alterations may be implemented so that the apparatus described is suitable for use in different applications, for example: for large vehicle batteries (e.g. truck or marine batteries), a higher starting current/voltage may be required. Therefore, a large capacitive store 122 (e.g. a store of over 200 Farads) may be used in these situations.

The capacitive store 122 within the jump starter 100 could be charged using any other energy store, not simply a depleted battery. Alternative energy stores may comprise, for example a USB charging device, or a cigarette lighter connection. A portable charger, as may be used for a phone, would not normally be capable of operating a starter motor (as it would not output sufficient current). The jump starter 100 as disclosed herein may be used with such a portable charger, where this may be useful in circumstances where the vehicle battery 18 cannot be used (where the stored energy has dropped too low, or where the vehicle battery 18 is damaged).

As well as a maximum power point tracking (MPPT) converter 130, any other type of DC-DC converter circuit capable of stepping up and/or stepping down current and/or voltage could be used. A buck-boost converter may be used in combination with a controller 152 which detects when to switch between buck and boost functionality. This is less desirable than using the MPPT converter 130 as it is not as efficient, but may be used to reduce the complexity of the jump starter 100.

The MPPT converter 130, or another DC-DC converter may be configurable to optimise different properties of the energy store charging. This converter may be configured to minimise the charging time, or to minimise the energy losses related to the charging of the energy source.

The detailed description has primarily considered a load applied across the terminals of the vehicle battery 18. More generally, any load may be coupled to the jump starter 100, where the positive connector 15 and the negative connector 17 of the jump starter may be disconnected from the vehicle battery 18 and connected to another load. Where the load is applied across the terminals of the vehicle battery 18, this load is connected to the jump starter 100 via these terminals.

While the capacitive store 122 has been described as, in some embodiments, comprising a charge pump arranged to discharge at a higher voltage than the charging voltage $V_C$, the capacitive store 122 may equally comprise a charge pump arranged to discharge at a lower voltage than the charging voltage $V_C$. For example, by charging in series and discharging in parallel, a reduced (as compared to the charging voltage) discharging voltage could be obtained. Such an embodiment may be used where a high voltage battery is used to charge the jump starter 100.

While this embodiment considers alteration of the charging current $I_C$, the MPPT converter 130 may also alter the charging voltage $V_C$ to maximise the charging power. In some embodiments, the charging voltage $V_C$ and charging current $I_C$ are related such that altering the current will also alter the voltage and vice versa. More specifically, increasing the charging voltage $V_C$ will decrease the charging current $I_C$. In some embodiments, the supply voltage $V_S$ and supply current $I_S$ are comparably related, where increasing the drawn supply voltage $V_S$ decreases the drawn supply current $I_S$.

In embodiments where the charging voltage $V_C$ is altered, the charging voltage may be incremented from an initial value of 0 v, or the initial value may be higher. The voltage may be decremented from the initial value. In some embodiments, the initial charging voltage $V_C$ is equal to the supply voltage $V_S$.

Where the charging voltage $V_C$ is initially set at a non-zero level, the MPPT converter 130 may initially decrease the charging voltage $V_C$ before determining whether this has resulted in an increase in the charging power and/or charging current $I_C$ supplied to the capacitive store 122. In more detail, the MPPT converter 130 compares the detected current to the current threshold and when the MPPT converter 130 determines that the current output by the MPPT converter 130 to the capacitive store 122 is below a threshold current, the MPPT converter 130 stops decreasing the charging voltage $V_C$. The MPPT converter 130 then increases the charging voltage $V_C$ until this threshold current is exceeded at which point the MPPT converter 130 stops increasing the current voltage. This method may decrease the charging time as compared to starting at 0V as, because the charging voltage $V_C$ is initially greater than the voltage $V_{CAP}$ across the capacitive store 122, the capacitive store 122 charges during the determination of the preferred charging voltage $V_C$.

In some embodiments, the jump starter 100 is semi-permanently fitted in the vehicle. The controller 152 may then be able to detect a depleted battery (either through a drop in the voltage available across the terminals, or through detection of an unsuccessful starting attempt). Such an unsuccessful starting attempt may trigger the operation of the MPPT converter 130, so that the capacitive store 122 begins charging automatically. More generally, the controller 152 may be arranged to detect the charge stored by the battery and activate the MPPT converter 130 upon this stored charge dropping below a threshold. This threshold is preferably that which precludes successful operation of a starting motor. The measure used to detect a depleted battery may be the voltage across the battery terminals, where, for example, a healthy car battery may have a voltage of 12.6V. The jump starter 100 may be arranged to trigger the operation of the MPPT converter 130 upon the voltage across the battery dropping below a threshold, preferably a threshold of 4V, more preferably a threshold of 7V, yet more preferably a threshold of 10V. A threshold of 10V is low enough to have a small chance of unnecessary operation, but large enough that a depleted battery (which may have a voltage around 8V) is likely to trigger operation of the MPPT converter 130.

The testing for a depleted battery may, for example, occur when a door is opened (possibly remotely), so that the jump starter apparatus may be ready to turn over the starter motor once a user attempts to start the vehicle.

While the detailed description has considered the controller 152 detecting a voltage draw before closing the switch 20, in some embodiments alternative conditions are alternatively, or also, considered before the switch 20 is closed:

The switch 20 may be closed by the user closing the arming switch 168.

The arming switch 168 may be remote to the jump starter 10, for example it may be arranged to be attached to a keyring, or it may be arranged to be attached to the dashboard of a vehicle. The controller 152 may receive an instruction to close the switch 20 via, for example, a Bluetooth™, infrared, or WiFi connection once the arming switch 168 is closed.

The switch 20 may be connected to an engine starting circuit, where the switch 20 is closed when a user attempts to start the engine, e.g. by pressing an engine starting button or turning a key in the ignition; such an implementation may be preferred where the jump starter 100 is provided as a semi-permanently fitted device.

The controller 152 may use a timing circuit to open and close the switch 20. In a preferred embodiment, a time $t_1$ after the arming switch 168 is closed, the controller 152 closes the switch 20 and a time $t_2$ after the arming switch is pressed the controller 152 opens the switch 20. During the intervening period ($t_1 < t < t_2$), the jump starter 100 is arranged to provide power to the vehicle battery 18 (and to the starter motor). The times $t_1$ and $t_2$ may, for example, be user selected or dependent upon the amount of charge stored in the capacitor.

There may be an output means provided which corresponds to these times, for example a speaker that outputs "ready to start" at time $t_1$ and "time limit exceeded" at time $t_2$. There may also be provided an output that increases in, volume, frequency, or brightness between $t_1$ and $t_2$, for example there may be provided a speaker or an LED that beeps or flashes at an increasing rate.

The controller 152 may be configured to detect a noise, or a vibration. There may, for example, be a decibel threshold that causes the controller 152 to close the switch 20. A noise detection threshold may correspond to a bonnet, or a car door closing, or a vibration detection threshold may correspond to the vibration caused by a starter motor attempting to draw current from the vehicle battery 18 or a key being turned in an ignition.

The controller 152 may close the switch 20 as soon as a certain stored charge $Q_{STORED}$ is reached, for example a percentage above that needed to start a vehicle. An output means, such as the ready indicator 164, may then indicate that the switch 20 has been closed. With this implementation, a user may stay inside their vehicle and await the indication of the ready indicator 164 before attempting to start the vehicle. The jump starter 10 may be integrated with the vehicle starting system, for example it may be connected directly to an ignition switch, so that upon receipt of the indication of the output means, the vehicle is automatically started. In such implementations, the arming switch 168 may not be provided.

The above methods for closing the switch 20 may be combined, for example a noise threshold may be combined with a timer, so that the switch 20 is only closed for a certain amount of time after a door is heard to have been shut. These implementations may each be of use in differing situations, for example connecting the controller 152 to the engine starting system may simplify a jump starting method where the device is semi-permanently fitted; a remote arming switch 168 may be simple, cheap, and versatile (since it does not require a vehicle to draw a greater voltage than a threshold). These methods may also be used in combination, where the switch 20 is closed upon one of a plurality of conditions being met, e.g. a time being exceeded or a noise threshold being exceeded.

It will be understood that the present disclosure has been described above purely by way of example, and modifications of detail can be made within the scope of the invention.

Reference numerals appearing in the claims are by way of illustration only and shall have no limiting effect on the scope of the claims.

The invention claimed is:

1. Apparatus for providing power to a battery, the apparatus comprising:
   one or more capacitors; and
   a DC-DC converter coupleable between the battery and the one or more capacitors and arranged to draw a supply current from the battery and to provide a charging current to the one or more capacitors;
   wherein the DC-DC converter is arranged to determine a supply power drawn from the battery and to alter the supply current drawn from the battery dependent upon the determined supply power,
   wherein the one or more capacitors are arranged to supply a discharging current through the terminals of said battery; and
   wherein the one or more capacitors have a combined storage capacity of at least 3 kilojoules and/or a combined capacitance of at least of 50 Farads.

2. Apparatus according to claim 1, wherein the DC-DC converter is arranged to alter the supply current drawn from the battery to maximise the supply power drawn from the battery.

3. Apparatus according claim 1, wherein the DC-DC converter is arranged to alter the supply current drawn from the battery periodically.

4. Apparatus according to claim 1, wherein the DC-DC converter is arranged to determine a voltage across the one or more capacitors and to alter the charging current supplied to the one or more capacitors dependent upon the determined voltage.

5. Apparatus according to claim 1, wherein the DC-DC converter is operable to alter the charging current supplied to the one or more capacitors such that a charging voltage supplied to the one or more capacitors is less than a supply voltage across the battery and/or wherein the DC-DC converter is operable to alter the charging current supplied to the one or more capacitors such that a charging voltage provided to the one or more capacitors is greater than a/the supply voltage across the battery.

6. Apparatus according to claim 1, the apparatus comprising a controller arranged to detect a supply voltage across the battery and to initiate operation of the DC-DC converter upon detecting that the supply voltage across the battery is below a threshold, preferably wherein the threshold is at least 4V, more preferably at least 7V, yet more preferably at least 10V.

7. Apparatus according to claim 1, wherein the one or more capacitors are each an electrolytic capacitor or a supercapacitor and/or wherein the one or more capacitors comprises capacitors having differing capacitance values.

8. Apparatus according to claim 1, wherein the one or more capacitors have a combined storage capacity of at least 10 kilojoules, preferably between 10 kilojoules and 20 kilojoules and/or a combined of between 50 Farads and 100 Farads.

9. Apparatus according to claim 1, wherein the equivalent series resistance (ESR) of the apparatus is no greater than 5 milliohms, preferably no greater than 2 milliohm.

10. Apparatus according to claim 1, wherein the battery is a vehicle battery.

11. Apparatus according to claim 1, wherein the one or more capacitors are arranged to supply a voltage to a load, preferably wherein the load is a starter motor.

12. Apparatus according to claim 1, wherein the one or more capacitors are arranged to be alterably connected, and wherein the connection between the one or more capacitors is reversibly changeable between a parallel connection and a series connection.

13. Apparatus according to claim 1, wherein one or more of the capacitors are arranged to be connected in parallel within a charging configuration and/or wherein the one or more of capacitors are arranged to be connected in series within a discharging configuration.

14. A jump starter for a vehicle, the jump starter comprising the apparatus according to claim 1.

15. A method for providing power to a battery, the method comprising:
    providing one or more capacitors; and
    coupling a DC-DC converter between the battery and the one or more capacitors so as to draw a supply current from the battery and to provide a charging current to the one or more capacitors;
    determining a supply power drawn from the battery;
    altering the supply current drawn from the battery by the DC-DC converter dependent upon the determined supply power;
    supplying a discharging current through the terminals of said battery; and
    wherein the one or more capacitors have a combined storage capacity of at least 3 kilojoules and/or a combined capacitance of at least of 50 Farads.

16. Apparatus for charging one or more capacitors from a battery, the apparatus comprising:
    a DC-DC converter coupleable between the battery and the one or more capacitors and arranged to draw a supply current from the battery and to provide a charging current to the one or more capacitors;
    wherein the DC-DC converter is arranged to determine a supply power drawn from the battery and to alter the supply current drawn from the battery dependent upon the determined supply power; and
    wherein the one or more capacitors have a combined storage capacity of at least 3 kilojoules and/or a combined capacitance of at least of 50 Farads.

17. Apparatus according to claim 16, wherein the one or more capacitors have a combined storage capacity of at least 10 kilojoules and/or between 10 kilojoules and 20 kilojoules.

18. Apparatus according to claim 16, wherein the one or more capacitors have a combined capacitance of between 50 Farads and 100 Farads.

* * * * *